US012494845B2

(12) United States Patent
Rogers (10) Patent No.: US 12,494,845 B2
(45) Date of Patent: Dec. 9, 2025

(54) MULTI-ENDPOINT RADIO SPECTRUM REDISTRIBUTOR FOR VARIOUS SERVICES (71) Applicant: Carolina Next LLC, Greensboro, NC (US)

(72) Inventor: Rob Rogers, Greensboro, NC (US)

(*) Notice: Subject to any disclaimer, the term of this patent is extended or adjusted under 35 U.S.C. 154(b) by 377 days.

(21) Appl. No.: 18/229,382

(22) Filed: Aug. 2, 2023

(65) Prior Publication Data
US 2025/0047384 A1 Feb. 6, 2025

(51) Int. Cl.
H04B 10/25 (2013.01)
H04B 10/2575 (2013.01)

(52) U.S. Cl.
CPC .............. *H04B 10/25753* (2013.01)

(58) Field of Classification Search
CPC .................................. H04B 10/2575
See application file for complete search history.

(56) References Cited

U.S. PATENT DOCUMENTS

| 6,477,154 | B1* | 11/2002 | Cheong | H04W 16/32 370/467 |
|---|---|---|---|---|
| 10,484,081 | B1* | 11/2019 | Chang | H04N 7/20 |
| 10,735,095 | B1* | 8/2020 | Kim | H04B 10/25752 |
| 11,522,630 | B1* | 12/2022 | He | H04B 10/506 |
| 12,176,951 | B1* | 12/2024 | Murakowski | H04B 10/572 |
| 12,425,131 | B2* | 9/2025 | Chen | H04L 1/1614 |
| 2005/0003763 | A1* | 1/2005 | Lastinger | H04W 16/02 455/67.11 |
| 2010/0272447 | A1* | 10/2010 | Kolze | H04B 10/25751 398/192 |
| 2014/0314407 | A1* | 10/2014 | Bush | H04B 10/0793 398/45 |
| 2017/0041068 | A1* | 2/2017 | Murakowski | H04B 10/60 |
| 2017/0251242 | A1* | 8/2017 | Wang | H04N 21/4532 |
| 2018/0176027 | A1* | 6/2018 | DelSordo | H04L 65/612 |
| 2018/0309515 | A1* | 10/2018 | Murakowski | H04B 10/2575 |
| 2019/0140692 | A1* | 5/2019 | Sun | H01Q 5/50 |
| 2023/0170734 | A1* | 6/2023 | Hazani | H02J 13/00022 398/115 |
| 2025/0047384 | A1* | 2/2025 | Rogers | H04B 10/25753 |

OTHER PUBLICATIONS

Chen et al. "Low cost and high performance GPON, GEPON and RFoG optical network pentaplexer module design using diffractive grating approach" Jan. 2016, Optical Fiber Technology, vol. 27, p. 41-45 (Year: 2016).*

* cited by examiner

Primary Examiner — Tanya T Motsinger
(74) Attorney, Agent, or Firm — Alloy Patent Law; Walker Griffin Weitzel (57) ABSTRACT The present invention discloses a system for the effective capturing, amplifying, and redistribution of radio spectrum services. The system comprises a donor site with an antenna to receive signals, which are then filtered into multiple frequency bands. The filtered signals are amplified and converted into modulated light by a Hybrid Fiber Coax RF over Glass (RFOG) headend transmitter. The modulated light is carried via a fiber-optic cable to a Planar Lightwave Circuit (PLC) splitter that divides the light beam, directing it to multiple service sites. Each service site is equipped with an RFOG HFC node receiver that reconverts the modulated light back into radio signals. A transmission amplifier boosts these radio signals, enabling broad coverage and efficient redistribution of various radio spectrum services.

20 Claims, 4 Drawing Sheets

MULTI-ENDPOINT RADIO SPECTRUM REDISTRIBUTOR FOR VARIOUS SERVICES

FIELD OF THE INVENTION

The present invention pertains to the field of telecommunication or more specifically, a wireless communication system. This covers the design, application, use, and signal processing of telecommunications systems that communicate through the air using radio frequency (RF) signals. It encompasses areas such as cellular communication, radio broadcasting, and wireless networking among others. The specific subfield could be defined as "Radio Spectrum Redistribution Systems" or "Wireless Spectrum Repeater Systems". These terms highlight the system's focus on taking radio spectrum from a single source (or multiple sources) and redistributing it to multiple endpoints, acting as a repeater system with advanced frequency filtering capabilities.

BACKGROUND

Radio communication is a crucial aspect of various services including cellular phone services, public safety communications, and broadcast services. Traditionally, these services are delivered through direct radio signal propagation from a central source to the respective endpoints. However, due to geographic and distance limitations, direct propagation is not always feasible or efficient. Repeaters are commonly used to extend the range of these signals, but often these repeaters are designed for specific types of services or frequencies, limiting their flexibility and adaptability.

Moreover, the filtering mechanisms used in traditional systems typically employ either mechanical or electronic filters which may limit the system's ability to adapt to new frequency bands or services. This lack of adaptability becomes a significant issue as the spectrum of services and the demands on the radio spectrum continue to grow and evolve.

Therefore, there is a need for an improved system that can capture and redistribute radio spectrum across multiple service sites, and across a wide range of services, while employing a flexible, adaptable filtering mechanism.

SUMMARY

The present invention addresses the above-mentioned needs by providing a system capable of capturing radio spectrum from a donor site and redistributing it to multiple service sites, covering a wide range of services including, but not limited to, cellular phone service, public safety radio, UHF/VHF radio repeaters, and FM radio.

The system operates by capturing the desired service frequencies from the donor site using flexible and adaptable filtering mechanisms. These filtering mechanisms can be duplex or simplex and may comprise various technologies such as cavity filters, strip filters, mechanical filters, passive filters using inductors and capacitors, and software filters implemented in FPGAs.

The invention is adaptable to current and future technologies that can limit receive frequencies to a specific group. This flexibility allows for the redistribution of a diverse range of services, over variable distances, from hundreds of feet to hundreds of miles. The system's design allows for the efficient and adaptable delivery of radio spectrum services, thereby overcoming the limitations of traditional radio signal propagation and repeater systems.

The present invention proposes an advanced radio spectrum redistribution system. Herein, the downlink path mechanism is elaborated.

The process begins at the donor site, where an antenna picks up signals from multiple cellular service providers. The system is designed to be multi-source compatible, thus enhancing the range of services that can be redistributed. After the signals are captured, they are then passed through a set of filters. Each filter is designed to separate different frequency bands or groups, enabling distinct segregation of signals based on their frequencies. The use of various types of filters, including duplex or simplex filters, allows for flexibility and precision in signal filtering. Once the signals are appropriately separated, they are directed into a low noise amplifier. This amplifier strengthens the signals post-filtering, ensuring minimal loss of signal strength during the filtering process. Following the amplification, the signals are fed into a combiner, which consolidates the signals into a unified transmission. This combined signal is then sent into a Hybrid Fiber Coax (HFC) RF over glass headend transmitter, which transmits the signals over fiber optic cables. The transmission is facilitated by modulating the radio frequencies into a laser beam. This laser beam is then transmitted over the fiber optic cable, providing a medium for efficient long-distance signal transmission with minimal loss. To serve multiple service sites, the laser beam is split using PLC splitters or similar technologies. These splitters divide the laser beam into multiple beams, each directed to a different service site. This allows the system to redistribute the captured signals to several locations simultaneously. At each service site, the laser beam is converted back into radio signals by a Hybrid Fiber Coax (HFC) RF over Glass HFC node receiver. This receiver decodes the laser beam back into the respective radio frequencies, which can then be utilized for their respective services at each location. The invention's downlink path mechanism ensures effective, efficient, and flexible redistribution of radio signals from multiple sources to multiple endpoints, overcoming traditional system limitations.

The radio spectrum redistribution system of the present invention also incorporates a sophisticated uplink path for the redistribution of signals from service sites to the original donor site, providing a full-duplex communication system when applicable. This uplink path begins at the service site, where antennas are deployed to capture uplink transmissions emanating from devices such as cellphones. This reception capability facilitates the receipt of various uplink frequencies from multiple devices concurrently. Following the receipt of these signals, they are isolated and separated based on their respective frequencies using precise radio filters. This step ensures that different signals are accurately identified and categorized based on their frequency bands. After frequency separation, the signals are directed to an amplifier, which strengthens these typically weak signals to an acceptable level, thereby ensuring minimal loss during the subsequent transmission. The separate frequency bands, post-amplification, are then combined into a unified transmission. This signal consolidation is then converted into a modulated light by a Hybrid Fiber Coax (HFC) RF over glass transmitter, preparing the signal for long-distance, high-speed transmission. At the point of consolidation, the signals from multiple service sites are combined using PLC splitters or similar fiber-optic splitting technology. This action brings together the signals from various sites into a single, modulated laser beam. This combined beam is then demodulated at the donor site, converting the laser signal back into radio frequencies. These radio signals are amplified once again using a more powerful amplifier to ensure a strong, clear signal. Finally, the amplified signal is emitted from the antenna at the donor site to the cellular tower that services the area, effectively completing the uplink communication path. By this design, the invention presents a bi-directional communication system that can capture, segregate, amplify, and redistribute radio signals from multiple cellular service providers to multiple service sites and vice versa. This process optimizes the delivery of various radio spectrum services, providing a highly efficient, flexible, and adaptable radio spectrum redistribution system.

The invention's design and functionality extend to the redistribution of one-way simplex broadcast technologies, often used for services such as XM radio, FM radio, and over-the-air broadcasts. This capability is realized using the downstream process alone, indicating the system's flexibility to cater to both duplex and simplex communication needs.

Given its versatile design, the system has significant implications for areas that were previously impractical to service using existing technologies. It effectively reduces the limitations imposed by geographical obstacles and broadens the coverage of various radio spectrum services, including cellular, public safety radio, UHF/VHF radio repeaters, and broadcast services, in a cost-effective manner. It accommodates both small cells and large cells, further extending its potential for widespread application.

The invention also includes provisions for isolating uplink signals on an area-by-area basis, allowing for the identification and management of radio interference issues. This feature reduces the likelihood of signal disruption and maintains the quality and reliability of the system's service delivery. It also simplifies the process of isolating and addressing potential interference issues, maintaining the system's performance without requiring significant design changes.

The system under discussion is designed to capture, amplify, and redistribute a variety of radio spectrum services. This process involves a donor site, which is typically located at a high elevation for optimal signal reception. The donor site is equipped with an antenna that receives signals from services such as cellular phone service, public safety radio, UHF/VHF radio repeaters, or FM radio. These signals are then filtered into multiple frequency bands using an assortment of filter types, which can include duplex filters, simplex filters, cavity filters, strip filters, passive filters, and software filters implemented in Field Programmable Gate Arrays (FPGAs). Once the received signals are filtered, they are amplified to enhance their strength. Subsequently, a Hybrid Fiber Coax RF over Glass (RFOG) headend transmitter converts these amplified signals into modulated light, which is then transmitted via a fiber-optic cable. To ensure service delivery to multiple sites, the modulated light beam is divided using a Planar Lightwave Circuit (PLC) splitter. The split beams are then sent to one or more service sites located hundreds of feet to hundreds of miles away from the donor site. Each of these service sites is equipped with an RFOG HFC node receiver, which reconverts the modulated light back into radio signals.

The system also includes an uplink pathway that receives, filters, and amplifies uplink transmissions from cellular devices or similar devices at the service sites. The amplified signals are combined, converted into a modulated light signal, and combined again with light signals from multiple service sites. The final combined light signal is transmitted back to the appropriate cellular tower via the donor site.

For Time Division Duplexing (TDD) cell phone service on millimeter wave frequencies, the system separates uplink and downlink activities using a single-pole double-throw (SPDT) switch. The switch is normally closed on the downlink connection and toggles to the uplink side when uplink activity exceeds a certain threshold.

The system can also connect to an eNodeB Base Transceiver Station (BTS) instead of an antenna. In this setup, the downlink pathway is primarily used for signaling since it only "hears" the connected BTS. This system is capable of supporting both Frequency Division Duplexing (FDD) and TDD, and can transport various radio services over large distances, thereby enhancing connectivity in areas that might otherwise be challenging to cover.

The components of the system, including the donor site, filters, amplifier, RFOG headend transmitter, fiber-optic cable, PLC splitter, service sites, and transmission amplifier function in a coordinated manner to capture, amplify, and redistribute radio spectrum services. The system is also designed to incorporate future technologies for signal filtering, amplification, conversion, transmission, and reception to improve the performance and coverage of the radio spectrum services.

The disclosed invention is a comprehensive solution for radio spectrum redistribution, offering capabilities that enhance service coverage, provide flexibility in handling different types of signals, improve interference management, and achieve these objectives in a cost-effective manner.

BRIEF DESCRIPTION OF THE ACCOMPANYING DRAWINGS

The novel features which are believed to be characteristic of the present invention, as to its structure, organization, use, and method of operation, together with further objectives and advantages thereof, will be better understood from the following drawings in which a presently preferred embodiment of the invention will now be illustrated by way of example. It is expressly understood, however, that the drawings are for the purpose of illustration and description only and are not intended as a definition of the limits of the invention. Embodiments of this invention will now be described by way of example in association with the accompanying drawings in which.

Further areas of applicability of the present invention will become apparent from the detailed description provided hereinafter. It should be understood that the detailed description of exemplary embodiments is intended for illustration purposes only and is, therefore, not intended to necessarily limit the scope of the invention.

DETAILED DESCRIPTION

As used in the specification and claims, the singular forms "a", "an" and "the" may also include plural references. For example, the term "an article" may include a plurality of articles. Those with ordinary skill in the art will appreciate that the elements in the Figures are illustrated for simplicity and clarity and are not necessarily drawn to scale. For example, the dimensions of some of the elements in the Figures may be exaggerated, relative to other elements, to improve the understanding of the present invention. There may be additional components described in the foregoing application that are not depicted on one of the described drawings. In the event such a component is described, but not depicted in a drawing, the absence of such a drawing should not be considered as an omission of such design from the specification.

It should be observed that the present invention utilizes a combination of components or set-ups, which constitutes a system and a method capable of capturing radio spectrum from a donor site and redistributing it to multiple service sites. Accordingly, the components have been represented, showing only specific details that are pertinent for an understanding of the present invention so as not to obscure the disclosure with details that will be readily apparent to those with ordinary skill in the art having the benefit of the description herein. As required, detailed embodiments of the present invention are disclosed herein; however, it is to be understood that the disclosed embodiments are merely exemplary of the invention, which can be embodied in various forms. Therefore, specific structural and functional details disclosed herein are not to be interpreted as limiting, but merely as a basis for the claims and as a representative basis for teaching one skilled in the art to variously employ the present invention in virtually any appropriately detailed structure. Further, the terms and phrases used herein are not intended to be limiting but rather to provide an understandable description of the invention.

References to "one embodiment", "an embodiment", "another embodiment", "yet another embodiment", "one example", "an example", "another example", "yet another example", and so on, indicate that the embodiment(s) or example(s) so described may include a particular feature, structure, characteristic, property, element, or limitation, but that not every embodiment or example necessarily includes that particular feature, structure, characteristic, property, element or limitation. Furthermore, repeated use of the phrase "in an embodiment" does not necessarily refer to the same embodiment.

The words "comprising." "having." "containing," and "including." and other forms thereof, are intended to be equivalent in meaning and be open ended in that an item or items following any one of these words is not meant to be an exhaustive listing of such item or items or meant to be limited to only the listed item or items. Unless stated otherwise, terms such as "first" and "second" are used to arbitrarily distinguish between the elements. Thus, these terms are not necessarily intended to indicate temporal or other prioritization of such elements. While various exemplary embodiments of the disclosed invention have been described below it should be understood that they have been presented for purposes of example only, not limitations. It is not exhaustive and does not limit the invention to the precise form disclosed. Modifications and variations are possible considering the above teachings or may be acquired from practicing of the invention, without departing from the breadth or scope.

This invention pertains to a multi-endpoint radio spectrum redistributor that efficiently captures radio signals from a donor site, processes these signals, and redistributes them to multiple service sites. It serves a broad range of services, such as cellular communication, public safety radio, UHF/VHF radio repeaters, and broadcast services. It employs various types of filters for precise frequency segregation and amplifiers for signal strengthening. The invention's unique design caters to both full-duplex and simplex communication needs and offers advanced features for managing radio interference issues.

Donor Site: The donor site is the starting point or source of the radio signals that are to be redistributed. It's typically located in a place that has strong and clear reception of the signals from multiple service providers. The donor site is outfitted with an antenna to pick up signals and other equipment to separate the different frequency bands, amplify the signals, combine them, and convert into a modulated laser beam for transmission over fiber optic cables.

Service Sites: These are the endpoint locations that receive the redistributed signals from the donor site. Each service site is equipped with devices that convert the laser signal back into radio frequencies, which are then used for respective services like cellular communication, public safety radio, UHF/VHF radio repeaters, or broadcast services. In the case of two-way communication, the service sites also capture uplink signals from devices, process them, and send them back to the donor site.

Filters: Filters are essential components in the system that help in segregating the signals based on their frequencies. Depending on the design, filters can be mechanical, like cavity or strip filters, passive, consisting of inductors and capacitors, or implemented in software on an FPGA. These filters play a crucial role in separating different services or frequency bands and ensuring that only the desired frequencies are processed and transmitted.

Amplifiers: These are electronic devices that increase the power of a signal. In this context, low noise amplifiers are used after the filtering process to boost the strength of the signals without adding much noise. Similarly, more powerful amplifiers are used at the donor site post-demodulation for uplink signals, ensuring a clear, strong signal for transmission to the cellular tower.

Hybrid Fiber Coax (HFC) RF over Glass Headend Transmitter: This device performs the function of transforming the combined radio frequencies into a modulated laser beam. It uses the principle of electro-optic modulation to convert the electronic signals (radio frequencies) into optical signals (laser) which can then be transmitted over fiber optic cables.

PLC Splitters: Planar Lightwave Circuit (PLC) splitters are used to split the optical signals into multiple output fibers. They are designed to evenly divide the light signal, allowing for the simultaneous transmission of the same signal to multiple endpoints, or service sites.

HFC Node Receiver: This is the device located at each service site that receives the modulated laser beam and converts it back into the respective radio frequencies. It essentially reverses the process conducted by the HFC headend transmitter at the donor site.

Full-Duplex Communication: This is a communication system that allows for simultaneous bidirectional transmission of signals. In the context of this invention, it means that the system can handle both downlink (from the donor site to the service sites) and uplink (from the service sites to the donor site) transmissions concurrently.

Simplex Communication: In contrast to full-duplex, simplex communication refers to a system that allows for transmission of signals in one direction only. For services like broadcast radio, the system only needs to perform the downlink transmission.

Radio Interference: This is a phenomenon where multiple signals in the same frequency band disrupt the reception of the desired signal. It can occur when devices are transmitting signals at the same frequency and can cause degradation or loss of the signal. This invention offers the capability to isolate uplink signals on an area-by-area basis, allowing for easier management of potential interference issues.

Antenna: An antenna is a transducer that converts electrical signals into radio waves, and vice versa. It is an essential component of communication systems and can have various forms depending on the frequency and power of the signals they are designed to transmit or receive. In this invention, antennas are used both at the donor site to pick up signals and at the service sites to distribute them.

Duplexer: A duplexer is a device that allows bi-directional (duplex) communication over a single path. In radio communication systems, it allows the use of a single antenna for both transmission and reception. The duplexer separates the transmission and reception frequencies, which are sufficiently different to prevent interference.

Downlink LNA (Low Noise Amplifier): This refers to the amplifier used in the downlink signal path. The purpose of the LNA is to amplify the signals received from the donor site while adding the least possible amount of noise. The downlink LNA ensures that the redistributed signals are strong enough for the services at the service sites.

Uplink Amplifier: The uplink amplifier is used in the uplink signal path. This amplifier takes the signals received from the service sites, which are typically weak due to distance and signal loss and amplifies them to an acceptable level before they are transmitted back to the donor site.

RFOG (RF Over Glass) Receiver: An RFOG receiver is a device that receives the modulated laser signal transmitted over the fiber optic cable. It then demodulates this signal back into its original radio frequency for further processing. This device is located at the service sites.

RFOG (RF Over Glass) Transmitter: An RFOG transmitter is a device that transforms the combined radio frequencies into a modulated laser signal. This is accomplished using electro-optic modulation. The laser signal can then be transmitted over fiber optic cables to the service sites. This device is located at the donor site.

Uplink Splitter: An uplink splitter is a device used to combine the uplink signals from multiple service sites into one signal that is sent back to the donor site. It can also be used to isolate signals on an area-by-area basis to manage potential interference issues. The combined signals are then amplified and transmitted to the cellular tower that services the area.

Downlink Splitter: A downlink splitter, such as a Planar Lightwave Circuit (PLC) splitter, is used to split the laser beam carrying the downlink signals into multiple beams. Each of these beams is directed to a different service site, allowing the simultaneous redistribution of the same signal to multiple endpoints.

The invention will now be described with reference to the accompanying drawings which should be regarded as merely illustrative without restricting the scope and ambit of the present invention.

Figure 1:
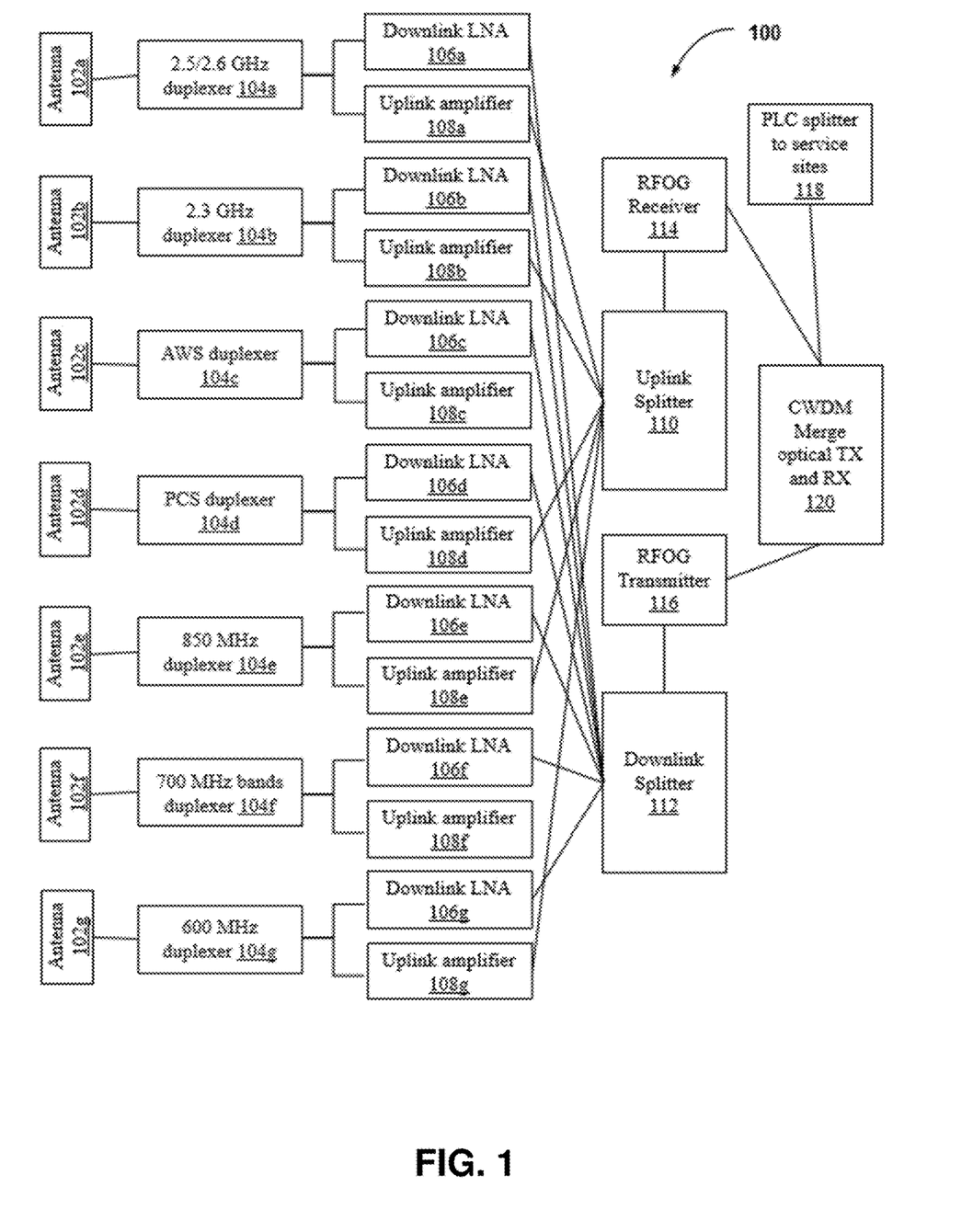
FIG. 1 is a diagram illustrating a multi-band donor site with a single polarity/spatial stream, in accordance with an embodiment of the present invention.

FIG. 1 is a diagram 100 illustrating a multi-band donor site with a single polarity/spatial stream, in accordance with an embodiment of the present invention. This figure provides a detailed view of the system at the donor site, showing the mechanisms for capturing multiple bands of radio frequencies, their segregation, and initial processing before redistribution.

As shown, the system includes one or more antennas such as an antenna 102a, an antenna 102b, an antenna 102c, an antenna 102d, an antenna 102e, an antenna 102f, and an antenna 102g. The antenna 102a may correspond to a 2.5/2.6 GHz parabolic antenna, the antenna 102b may correspond to a 2.3 GHz parabolic antenna, the antenna 102c may correspond to a AWS antenna, the antenna 102d may correspond to a PCS antenna, the antenna 102e may correspond to a 800 MHz YAGI antenna, the antenna 102f may correspond to a 700 MHz YAGI antenna, and the antenna 102g may correspond to a 600 MHz YAGI antenna, but should not be construed as limiting to the scope of the present invention.

Further, the system includes one or more duplexers such as a duplexer 104a, a duplexer 104b, a duplexer 104c, a duplexer 104d, a duplexer 104e, a duplexer 104f, and a duplexer 104g. The duplexer 104a may correspond to a 2.5/2.6 GHz duplexer and may be configured to receive a signal from the antenna 102a. The duplexer 104b may correspond to a 2.3 GHz duplexer and may be configured to receive a signal from the antenna 102b. The duplexer 104c may correspond to an AWS duplexer and may be configured to receive a signal from the antenna 102c. The duplexer 104d may correspond to a PCS duplexer and may be configured to receive a signal from the antenna 102d. The duplexer 104e may correspond to an 850 MHz duplexer and may be configured to receive a signal from the antenna 102e. The duplexer 104f may correspond to a 700 MHz duplexer and may be configured to receive a signal from the antenna 102f. The duplexer 104g may correspond to a 600 MHz duplexer and may be configured to receive a signal from the antenna 102g.

Further, the system includes one or more downlink LNAs such as a downlink LNA 106a, a downlink LNA 106b, a downlink LNA 106c, a downlink LNA 106d, a downlink LNA 106e, a downlink LNA 106f, and a downlink LNA 106g. Further, the system includes one or more uplink amplifiers such as an uplink amplifier 108a, an uplink amplifier 108b, an uplink amplifier 108c, an uplink amplifier 108d, an uplink amplifier 108e, an uplink amplifier 108f, and an uplink amplifier 108g. Each downlink LNA has an adjustable output power ranging from 17 dBm to 28 dBm. Further, each uplink amplifier is associated with a first-stage output power ranging from 28 dBm to 33 dBm and a second-stage power output reaching up to 40 dBm.

Further, the system includes an uplink splitter 110, a downlink splitter 112, an RFOG receiver 114, an RFOG transmitter 116, a PLC splitter to service sites 118, and a CWDM merge optical TX and RX 120. In an embodiment, the uplink splitter 110 is utilized to combine the uplink signals from multiple service sites into one signal. This signal is then transmitted back to the donor site. This component also provides the flexibility to isolate signals on an area-per-area basis to manage potential interference issues. In an embodiment, the downlink splitter 112 is employed to split the combined radio frequency signals into multiple signals, each of which is directed to a different service site. This component, such as a Planar Lightwave Circuit (PLC) splitter, allows the simultaneous redistribution of the same signal to multiple endpoints. In an embodiment, the Radio Frequency over Glass (RFOG) receiver 114 is a device that receives the modulated laser signal transmitted over the fiber optic cable, and then demodulates this signal back into its original radio frequency for further processing. In an embodiment, the RFOG transmitter 116 is responsible for transforming the combined radio frequencies into a modulated laser signal, accomplished using electro-optic modulation. This modulated laser signal can then be transmitted over fiber optic cables to the service sites. In an embodiment, the PLC splitter to service sites 118 is a device used to split the modulated laser signal into multiple beams, each of which is directed to a different service site. This splitting enables the system to distribute the radio spectrum services to multiple locations simultaneously. In an embodiment, the Coarse Wavelength Division Multiplexing (CWDM) merge optical TX and RX 120 is a system that multiplexes multiple optical carrier signals on a single optical fiber by using different wavelengths of laser light. This enables multiple types of data coming from different sources to be transmitted simultaneously over a single fiber, enhancing the system's bandwidth utilization and efficiency.

In operation, in one embodiment, the antenna 102a receives radio signals from various cellular providers. These signals are forwarded to the 2.5/2.6 GHz duplexer 104a. The purpose of the duplexer is to allow bidirectional communication over a single path, essentially permitting the same antenna to be used for both transmitting and receiving. The downlink LNA 106a, which has an adjustable output power ranging from 17 dBm to 28 dBm, is connected to the duplexer 104a. The signals received from the antenna are amplified by the LNA and then passed to the downlink splitter 112. The downlink splitter 112 splits the amplified signals into multiple signals, each to be sent to a different service site. The split signals are then forwarded to the RFOG transmitter 116, which converts the radio frequencies into a modulated laser signal for transmission over fiber optic cables. The CWDM merge optical TX and RX 120 receives the modulated laser signal from the RFOG transmitter 116. This device multiplexes multiple optical carrier signals on a single optical fiber by using different wavelengths of laser light, facilitating simultaneous transmission of multiple types of data over a single fiber. On the other hand, the uplink path is used for transmitting signals from the service sites back to the donor site. The uplink amplifier 108a, which is also connected to the duplexer 104a, receives signals from the service sites, amplifies them, and passes them to the uplink splitter 110. The uplink splitter 110 combines these amplified signals into a single signal, which is then sent to the RFOG receiver 114. The RFOG receiver demodulates the laser signal back into its original radio frequencies. This received signal is then transferred to the CWDM merge optical TX and RX 120, which sends it back to the donor site over the fiber optic cable. The PLC splitter to service sites 118, which is connected to the CWDM merge optical TX and RX 120, further splits the signals into multiple beams for distribution to various service sites. This way the system enables the reception, amplification, and distribution of signals from a donor site to multiple service sites, while also facilitating the return path of signals from service sites back to the donor site.

In another embodiment, the antenna 102b captures radio signals from various cellular providers. These signals are then passed to the 2.3 GHz duplexer 104b. The role of the duplexer is to allow bidirectional (two-way) communication over a single path. This essentially permits the same antenna to be used for both signal transmission and reception. The downlink LNA 106b, which can be adjusted to provide output power ranging from 17 dBm to 28 dBm, is connected to the duplexer 104b. The signals received by the antenna are amplified by the LNA and then routed to the downlink splitter 112. The downlink splitter 112 splits the amplified signals into multiple signals, each of which is to be transmitted to a different service site. The split signals are then conveyed to the RFOG transmitter 116, which turns the radio frequencies into a modulated laser signal suitable for transmission over fiber optic cables. The CWDM merge optical TX and RX 120 takes the modulated laser signal from the RFOG transmitter 116. This component multiplexes multiple optical carrier signals into a single optical fiber by using different wavelengths (colors) of laser light. This facilitates the simultaneous transmission of different types of data over a single fiber. On the uplink side, the uplink amplifier 108b, connected to the duplexer 104b, receives signals from the service sites. It amplifies these signals and passes them to the uplink splitter 110. The uplink splitter 110 combines these amplified signals into a single signal, which is then transferred to the RFOG receiver 114. The RFOG receiver demodulates the laser signal back into its original radio frequencies. The received signal is then routed to the CWDM merge optical TX and RX 120, which sends it back to the donor site over the fiber optic cable. The PLC splitter to service sites 118, linked to the CWDM merge optical TX and RX 120, further splits the signals into multiple beams, each to be distributed to a different service site.

In another embodiment, the operation of the system described for the antenna 102c operates similarly to the earlier described operations for antenna 102a and 102b. However, in this case, the duplexer and the bands of operation are intended for Advanced Wireless Services (AWS) frequencies. The antenna 102c captures AWS radio signals from various sources. These signals are then fed into the AWS duplexer 104c. As with the other configurations, the duplexer allows for bidirectional (two-way) communication over a single path, enabling the same antenna to be used for both transmitting and receiving signals. The downlink LNA 106c, which can adjust output power from 17 dBm to 28 dBm, is connected to the AWS duplexer 104c. Signals received by the antenna are amplified by this downlink LNA and then forwarded to the downlink splitter 112. The downlink splitter 112 splits the amplified signals into multiple signals, which are then sent to different service sites. These split signals are routed to the RFOG transmitter 116, which converts these radio frequencies into a modulated laser signal for fiber optic cable transmission. The modulated laser signal is taken up by the CWDM merge optical TX and RX 120. This device combines multiple optical carrier signals onto a single optical fiber using different wavelengths (colors) of laser light, which allows for the simultaneous transmission of different types of data over a single fiber. For the uplink path, the uplink amplifier 108c, connected to the duplexer 104c, receives signals from the service sites. These signals are amplified and then sent to the uplink splitter 110. The uplink splitter 110 combines these amplified signals into a single signal that is sent to the RFOG receiver 114. The RFOG receiver then demodulates the laser signal back into its original AWS radio frequencies. This received signal is routed to the CWDM merge optical TX and RX 120, which sends it back to the donor site over the fiber optic cable. The PLC splitter to service sites 118, connected to the CWDM merge optical TX and RX 120, further splits the signals into multiple beams for distribution to various service sites.

In another embodiment, the operation of the system described for the antenna 102d is similar to the operations explained earlier, but in this case, the duplexer and the bands of operation are designed for the Personal Communications Service (PCS) frequencies. The antenna 102d receives PCS radio signals from various sources. These signals are then directed to the PCS duplexer 104d. As before, the role of the duplexer is to permit bidirectional (two-way) communication over a single path. This allows the same antenna to be used for both transmitting and receiving signals. The downlink LNA 106d, which can adjust output power from 17 dBm to 28 dBm, is connected to the PCS duplexer 104d. The signals received by the antenna are amplified by this downlink LNA and then routed to the downlink splitter 112. The downlink splitter 112 splits the amplified signals into multiple signals, which are then distributed to different service sites. These split signals are forwarded to the RFOG transmitter 116, which converts these radio frequencies into a modulated laser signal suitable for fiber optic cable transmission. The modulated laser signal is then picked up by the CWDM merge optical TX and RX 120. This device combines multiple optical carrier signals onto a single optical fiber using different wavelengths (colors) of laser light. This allows different types of data to be transmitted simultaneously over a single fiber. On the uplink path, the uplink amplifier 108d, connected to the duplexer 104d, receives signals from the service sites. These signals are amplified and then passed to the uplink splitter 110. The uplink splitter 110 combines these amplified signals into a single signal that is directed to the RFOG receiver 114. The RFOG receiver then demodulates the laser signal back into its original PCS radio frequencies. The received signal is then transferred to the CWDM merge optical TX and RX 120, which sends it back to the donor site over the fiber optic cable. The PLC splitter to service sites 118, connected to the CWDM merge optical TX and RX 120, further splits the signals into multiple beams for distribution to various service sites.

In another embodiment, the operational flow for the system involving the antenna 102e and the 850 MHz duplexer 104c follows a similar pattern as explained for the other frequency bands, but it targets a different frequency range—850 MHz. The antenna 102e is designed to receive and transmit radio signals within the 850 MHz band. These signals from various sources are first received by the antenna 102e, and then directed to the 850 MHz duplexer 104c. Duplexers allow bidirectional (two-way) communication over a single path. In this case, the 850 MHz duplexer 104e facilitates simultaneous transmission and reception of signals in the 850 MHz band. After the received signals are passed through the duplexer, they are sent to the downlink Low Noise Amplifier (LNA) 106e. The LNA, adjustable from 17 dbm to 28 dbm, amplifies these weak signals for further processing. Post amplification, these signals are directed to the downlink splitter 112, which divides the incoming signal into multiple signals that can be distributed to several endpoints. These split signals are then routed to the RF over Glass (RFOG) transmitter 116, which converts these amplified radio frequency signals into modulated laser signals. These modulated signals can then be sent over fiber optic cables. The modulated laser signals are then forwarded to the Coarse Wavelength Division Multiplexing (CWDM) merge optical TX and RX 120, which multiplexes signals from different channels onto a single optical fiber. For the uplink path, the uplink amplifier 108c, connected to the duplexer 104c, amplifies the received signals from the service sites. The amplified signals are then sent to the uplink splitter 110, which combines these signals into a single one. This combined signal is then sent to the RFOG receiver 114, which converts the modulated laser signals back into their original radio frequency form. The received signals are then forwarded to the CWDM merge optical TX and RX 120, which multiplexes them for sending back to the donor site over the fiber optic cable. Finally, the PLC splitter to service sites 118, which is connected to the CWDM merge optical TX and RX 120, divides the signal into multiple paths for distribution to different service sites. In essence, this operational flow facilitates efficient reception, amplification, and distribution of 850 MHz signals from a donor site to multiple service sites and allows the return path of signals from the service sites back to the donor site.

In another embodiment, the operational flow involving the antenna 102f and the 700 MHz duplexer 104f, although analogous to the other frequency bands, targets the specific frequency range of 700 MHz. The antenna 102f is designed to receive and transmit radio signals within the 700 MHz band. These signals from various sources are first received by the antenna 102f, and then directed to the 700 MHz duplexer 104f. The 700 MHz duplexer 104f facilitates simultaneous transmission and reception of signals in the 700 MHz band. It separates the uplink and downlink signals to allow bidirectional communication over a single path. Once the received signals are passed through the duplexer, they are sent to the downlink Low Noise Amplifier (LNA) 106f. The downlink LNA, adjustable from 17 dbm to 28 dbm, serves to amplify these weak signals without adding significant noise. After the signals have been amplified, they are directed to the downlink splitter 112, which divides the incoming signal into multiple output signals that can be routed to several end destinations. The split signals are then sent to the RF over Glass (RFOG) transmitter 116. The RFOG transmitter converts these amplified radio frequency signals into modulated laser signals suitable for transmission over fiber optic cables. These modulated laser signals are then sent to the Coarse Wavelength Division Multiplexing (CWDM) merge optical TX and RX 120. The CWDM merge optical TX and RX multiplexes signals from different channels onto a single optical fiber. On the uplink path, the uplink amplifier 108f, which is connected to the duplexer 104f, amplifies the signals received from the service sites. The amplified signals are then routed to the uplink splitter 110, which combines these signals into one. The combined signal is then forwarded to the RFOG receiver 114. The RFOG receiver converts the modulated laser signals back into their original radio frequency form. The received signals are then sent to the CWDM merge optical TX and RX 120, which multiplexes them for sending back to the donor site over the fiber optic cable. Finally, the PLC splitter to service sites 118, connected to the CWDM merge optical TX and RX 120, splits the signal into multiple paths for distribution to different service sites.

In another embodiment, the operational flow with the 600 MHz system components starts with the antenna 102g receiving signals in the 600 MHz band, which are then directed to the 600 MHz duplexer 104f. The duplexer separates the uplink and downlink signals. Downlink signals are amplified by the LNA 106g and then distributed by the downlink splitter 112. These split signals are converted to modulated light by the RFOG transmitter 116 and sent to the CWDM merge optical TX and RX 120, where they are combined onto a single optical fiber. Uplink signals are amplified by the Uplink amplifier 108g, combined by the uplink splitter 110, and converted back to RF signals by the RFOG receiver 114. These signals are then sent to the CWDM merge optical TX and RX 120. The PLC splitter to service sites 118 then distributes these signals to the multiple service sites.

The invention presents several advantages. It provides an efficient method to capture, amplify, and distribute radio signals across large areas, accommodating services that include but are not limited to cellular phone service, public safety radio, UHF/VHF radio repeaters, and one-way broadcast services like FM radio. The system is versatile, with a design that can accommodate various radio spectrum services and frequency bands through the use of filters. This means that it can be tailored to specific use cases. Furthermore, the system enhances signal strength and reduces noise via the use of low noise amplifiers and powerful uplink amplifiers. Its modular nature ensures case of troubleshooting, with the ability to isolate and rectify radio interference issues on an area-per-area basis. Moreover, the utilization of RF over Glass (RFOG) technology and the combination of signals into a single optical fiber for transmission results in cost-effective, high-quality signal distribution. This innovative solution thus enables the delivery of varied services over vast areas that may not be practically served by existing technologies, representing a significant improvement in the field of radio spectrum redistribution.

Figure 2:
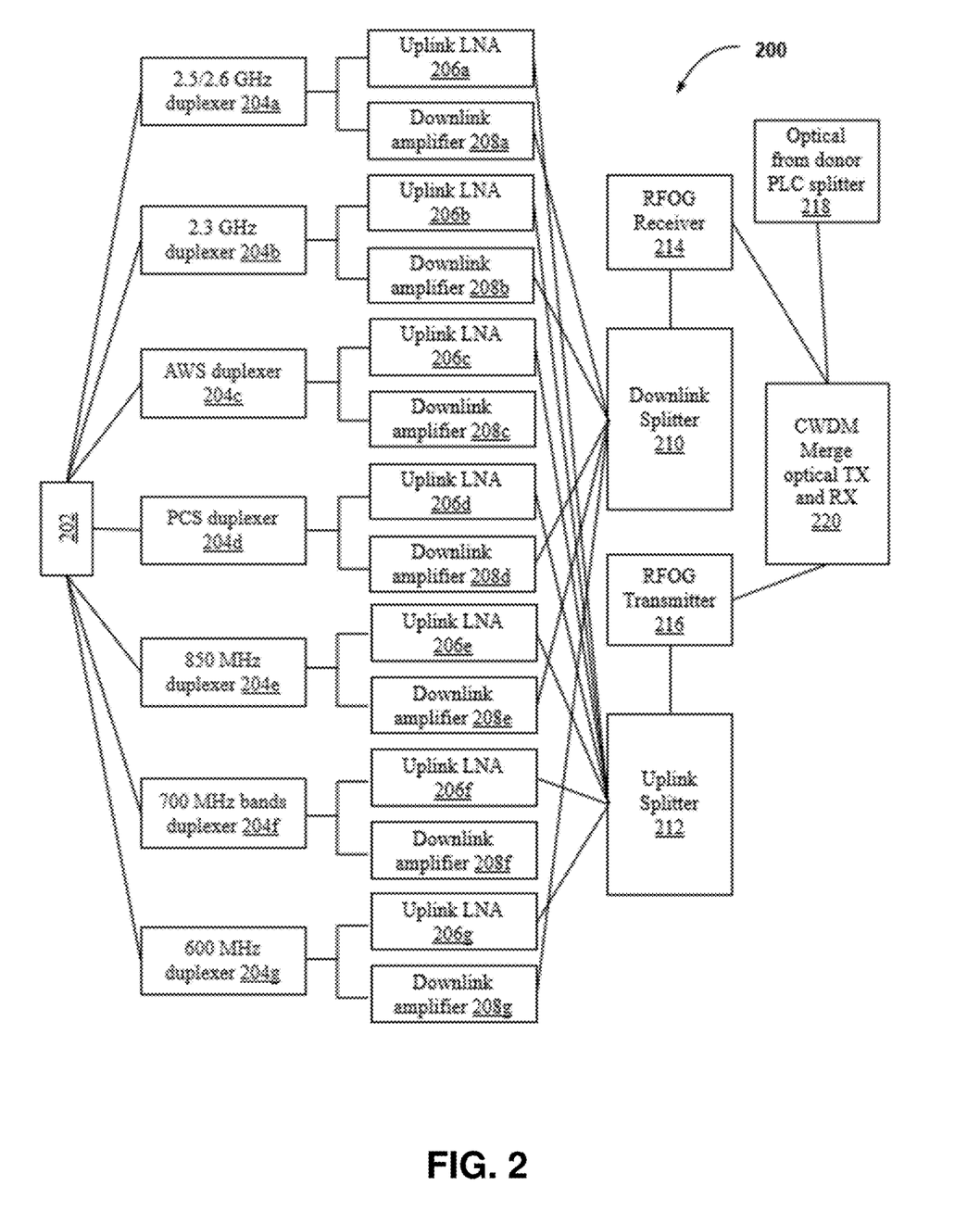
FIG. 2 is a diagram that presents an example of a service site, in accordance with an embodiment of the present invention.

FIG. 2 is a diagram 200 that presents an example of a service site, in accordance with an embodiment of the present invention. It details how the service site captures uplink signals, processes them, and sends them back to the donor site, as well as how it receives downlink signals from the donor site. The diagram 200 presents an example of a service site and its components, all working together to effectively transmit and receive signals. In this system, the multi-band antenna 202 receives signals from various frequency bands. These signals are then sent to respective duplexers, which are devices designed to allow simultaneous transmission and reception of signals by separating incoming and outgoing signals based on their frequency. Each duplexer, namely 204a through 204g, corresponds to different frequency bands ranging from 600 MHz to 2.6 GHz. They filter and separate the incoming signal based on its frequency and direct it to the corresponding uplink Low Noise Amplifier (LNA). Each of the uplink LNAs (206a-206g) associated with a specific frequency band is designed to amplify the received signals without adding significant noise. The amplification power of each uplink LNA can be adjusted between 17 dBm and 28 dBm, allowing the system to adjust for signal strength as needed. Once amplified, these signals are sent to an uplink splitter 212. The uplink splitter's role is to divide the amplified signal into multiple parts, ensuring signal delivery to several destinations or equipment without signal degradation. One of these destinations is the Radio Frequency Over Glass (RFOG) receiver 214, which converts the RF signals into optical signals. The RFOG receiver is coupled to a Coarse Wavelength Division Multiplexing (CWDM) merge optical Transmitter and Receiver (TX and RX) 220, which allows the system to transmit multiple optical signals over a single fiber. For the transmission of signals (downlink), each of the downlink amplifiers (208a-208g) receives signals from the respective duplexer. These amplifiers boost the strength of signals for transmission. The first stage of amplification brings the power output to between 28 dBm and 33 dBm, while the second stage can take it up to 40-49 dBm. These amplified downlink signals are then directed to a downlink splitter 210. Like the uplink splitter, the downlink splitter separates the signal into multiple outputs. These signals are passed to an RFOG transmitter 216, which converts the electrical signals back to optical signals. Finally, the signals are sent to the CWDM merge optical TX and RX 220 via the optical from donor PLC (Planar Lightwave Circuit) splitter 218.

The PLC splitter evenly divides optical signals from a single input to multiple outputs, allowing the system to serve multiple service sites simultaneously. Thus, the CWDM merge optical TX and RX 220 facilitates the merging of both uplink and downlink optical signals and their transmission over a single fiber-optic cable to the target destination. This system's operation ensures efficient, high-quality signal reception, amplification, and transmission across various frequency bands, offering a comprehensive solution for multi-band signal management at service sites.

Figure 3:
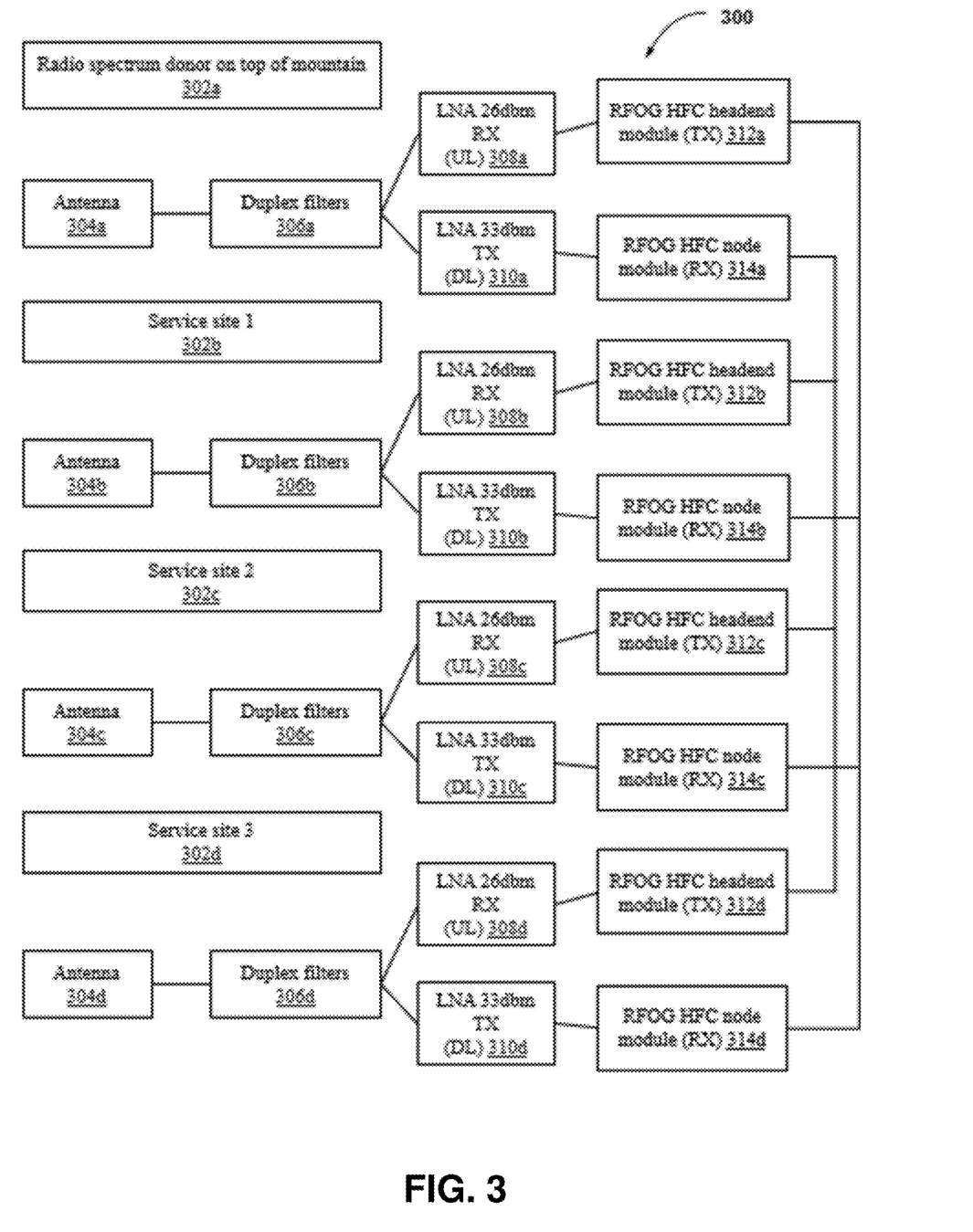
FIG. 3 is a diagram that illustrates the overall system, with a radio spectrum donor site situated on top of a mountain and multiple service sites located at various points, in accordance with another embodiment of the present invention.

FIG. 3 is a diagram 300 that illustrates the overall system, with a radio spectrum donor site situated on top of a mountain and multiple service sites located at various points, in accordance with another embodiment of the present invention. It visualizes how the system operates on a broader scale, depicting the signal redistribution from the donor site to the service sites and vice versa.

FIG. 3 presents an illustration of the overall system comprising a radio spectrum donor site 302a and multiple service sites (302b, 302c, and 302d). The donor site 302a is placed on top of a mountain, maximizing coverage and signal strength. It comprises an antenna 304a connected to a duplex filter 306a. The duplex filter allows simultaneous transmission and reception of signals by separating them based on frequency. The duplex filter 306a connects to two Low Noise Amplifiers (LNAs): an LNA 26 dBm RX (Uplink) 308a and an LNA 33 dBm TX (Uplink) 310a. LNAs are used to amplify the signals without adding significant noise, improving the Signal to Noise Ratio (SNR). The 'RX' denotes that the LNA 308a is designed for received signals, whereas 'TX' indicates that the LNA 310a is for transmitted signals. The LNA 26 dBm RX (Uplink) 308a is connected to an RFOG HFC headend module (TX) 312a, which converts radio signals to optical signals for transmission through the fiber network. Conversely, the LNA 33 dBm TX (Uplink) 310a connects to an RFOG HFC node module (RX) 314a, which converts optical signals back to radio signals for transmission. Similarly, the service sites 302b, 302c, and 302d have the same setup of antenna, duplex filter, LNAs, and RFOG modules, as shown.

The RFOG HFC headend module (TX) 312a at the donor site is connected to the RFOG HFC node modules (RX) at the service sites (314b, 314c, 314d). This connection forms the path for downlink signals from the donor site to the service sites. Similarly, the RFOG HFC node module (RX) 314a at the donor site is connected to the RFOG HFC headend modules (TX) at the service sites (312b, 312c, 312d). This forms the path for uplink signals from the service sites to the donor site.

The overall operation involves transmitting and receiving signals between the donor site and the service sites. For downlink operation, signals are received at the donor site's antenna, separated, and amplified, converted into optical signals by the RFOG headend module, and transmitted to the service sites through the fiber network. At the service sites, the optical signals are converted back into radio signals by the RFOG node module and broadcasted through the antenna. For uplink operation, signals are received at the service sites' antennas, separated, and amplified, converted into optical signals by the RFOG headend module, and transmitted to the donor site through the fiber network. At the donor site, the optical signals are converted back into radio signals by the RFOG node module and broadcasted through the antenna. This arrangement allows for efficient bidirectional communication between the donor site and multiple service sites over diverse geographical regions, providing robust and high-quality radio service to the served areas.

Figure 4:
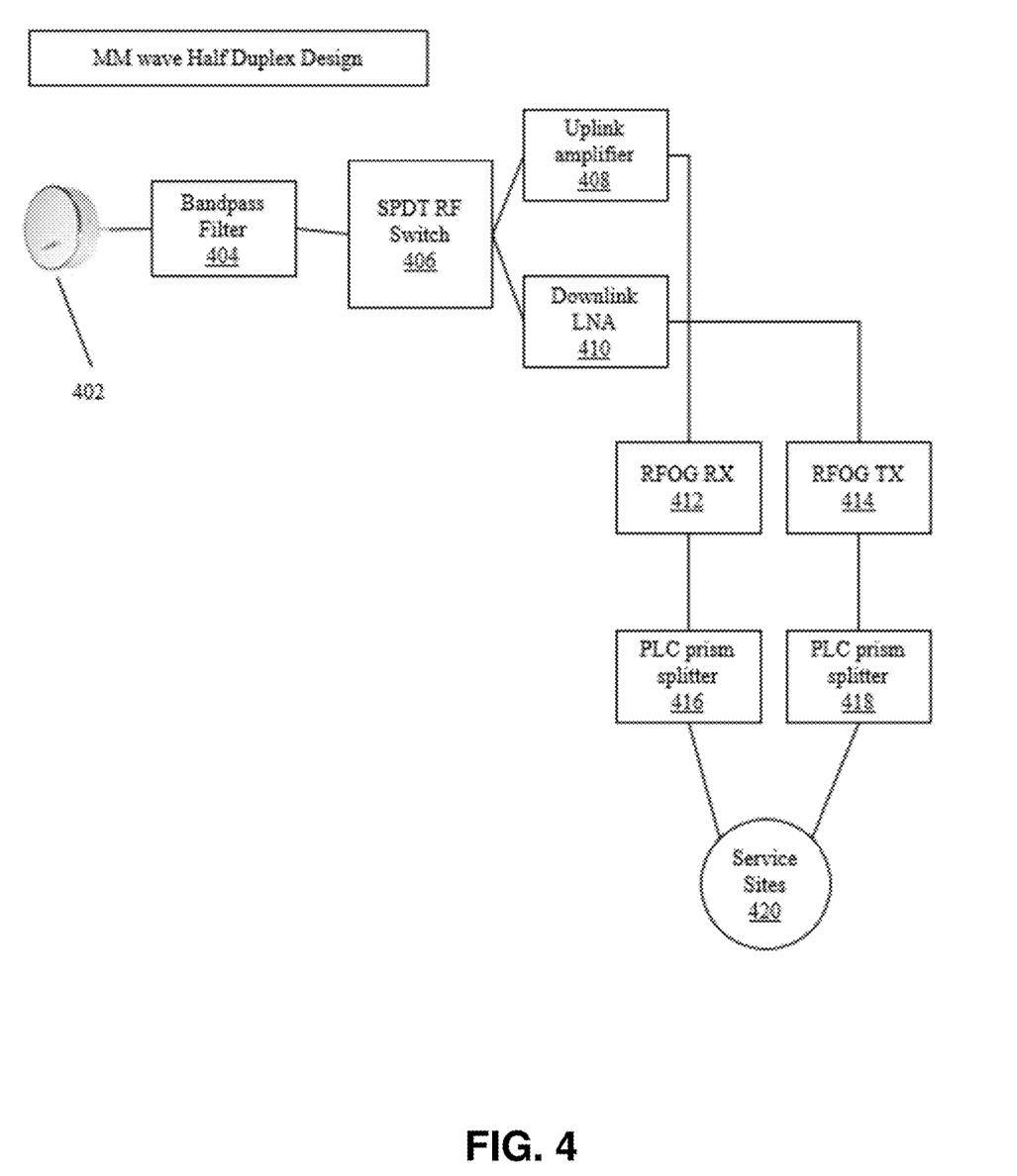
FIG. 4 is a diagram that illustrates a millimeter-wave (mmWave) half-duplex design, in accordance with another embodiment of the present invention.

FIG. 4 is a diagram 400 that illustrates a millimeter-wave (mmWave) half-duplex design, in accordance with another embodiment of the present invention. It presents a variation of the system designed for mmWave frequencies, demonstrating how the system can adapt to different types of radio frequencies and highlighting its flexibility and versatility. The illustrated design involves one path for signal transmission and another for reception, but these paths don't operate simultaneously; instead, they take turns, which is what characterizes a half-duplex system. The operation of this system involves the reception and transmission of signals from the antenna, filtering, amplifying, and switching of signals based on their operation mode (uplink or downlink), conversion between radio frequency and optical signals, and distribution or aggregation of signals to and from multiple service sites.

The system starts with an antenna 402, which serves as the point of reception and transmission for the signals. The antenna 402 is connected to a bandpass filter 404. The bandpass filter's role is to isolate a particular range of frequencies (the band of interest) from the incoming signal, in this case, the millimeter-wave frequencies. The filtered signal is then directed to a Single-Pole Double-Throw (SPDT) RF switch 406. The SPDT RF switch's function is to switch the pathway of the signal between the uplink amplifier 408 and the downlink Low Noise Amplifier (LNA) 410. This decision is based on whether the system is in transmission mode (uplink) or reception mode (downlink). When the system is in uplink mode (transmitting), the SPDT switch directs the signal to the uplink amplifier 408, which increases the signal strength for transmission. After amplification, the signal is then sent to the Radio Frequency Over Glass (RFOG) receiver (RX) 412, which converts the radio frequency signals into optical signals suitable for transmission over a fiber network.

When the system is in downlink mode (receiving), the SPDT switch directs the signal to the downlink LNA 410. The LNA boosts the received signal's power while adding as little noise as possible. This amplified signal is then passed to the RFOG transmitter (TX) 414, which converts optical signals from the fiber network back into RF signals for further transmission. In the system, the RFOG RX 412 is connected to a Planar Lightwave Circuit (PLC) prism splitter 416, which evenly splits the optical signal to multiple outputs, providing a connection to various service sites 420. This splitting allows for simultaneous service to multiple locations. Similarly, the RFOG TX 414 is also connected to a PLC prism splitter 418, which collects and combines the signals from multiple service sites 420, converting them back to optical signals and sending them back through the fiber network.

The system in FIG. 4 operates based on Time Division Duplexing (TDD) for mmWave 5G service. TDD allows the uplink and downlink to share the same frequency band by assigning different time slots for transmission (uplink) and reception (downlink). The decision on whether to switch to the uplink or downlink side depends on the activity of the connected phone. When there's high activity in the uplink, it indicates that the phone is in a transmission mode (i.e., it is an uplink timeslot). At this moment, the system will switch to the uplink side, using the uplink amplifier 408 and RFOG RX 412 to amplify and convert the signal, respectively. The signal will then be divided by the PLC prism splitter 416 and sent to the service sites 420. However, to prevent interference, care must be taken to ensure that only one site is in the antenna beam at a time. This is crucial in mmWave communications due to the highly directional nature of the signal. When the uplink activity is low, it indicates that the phone is in the downlink timeslot. The system then switches to the downlink side, repeating the downlink signal. The RFOG TX 414 will receive the optical signals, convert them into RF signals, and the downlink LNA 410 will amplify these signals before they are sent to the antenna 402 for transmission. The same process is reversed at the service site, depending on whether it's an uplink or downlink timeslot. Alternatively, instead of an antenna, an eNodeB Base Transceiver Station (BTS) can be connected to the system. The eNodeB is a part of the 4G/5G network infrastructure that communicates directly with mobile devices. In this case, the downlink pathway will be primarily used for signaling since it will only "hear" the connected BTS, indicating that the BTS is transmitting signals to the mobile devices. Thus, this configuration allows the system to support network-controlled signaling and communication.

The invention under discussion is a system that takes the radio spectrum from a specific location (the donor site) and repeats it across multiple other locations (service sites). This system has several unique parts and steps that work together to enable this functionality.

The system commences its operation with the reception of radio signals at a donor site, which, for instance, could be located on top of a mountain to ensure optimal signal reception. These signals could be from various radio spectrum services, including but not limited to cellular phone service, public safety radio for police, fire and EMS, UHF/VHF radio repeaters, and one-way services like FM radio.

The captured signals are filtered using duplex filters (for full-duplex communication) or simplex filters (for half-duplex communication), as per the requirement. These filters could be cavity or strip filters, passive filters composed of inductors and capacitors, software filters implemented in FPGAs, or any future technological advancements that can filter out specific frequency bands.

In the Downlink Path (Frequency Division Duplexing, FDD, and simplex specific), the received signal from various cellular providers is divided into multiple frequency bands or groups via these filters. Each group of signals is then amplified by a low noise amplifier (LNA) post-filtering. The separated signals are combined and transferred to a Hybrid Fiber Coax RF over Glass (RFOG) headend transmitter, which converts these radio signals into a modulated laser signal. This signal is then sent over a fiber-optic cable and split using Planar Lightwave Circuit (PLC) splitters or similar technology, capable of splitting a beam of light to send to multiple service sites. At the service site, the laser signal is converted back into radio signals by an RFOG HFC node receiver. These signals are then amplified again, this time more powerfully for transmission purposes, and sent out via the service site's antenna to cover the service area.

For the Uplink Path (FDD-specific), the process is somewhat mirrored. The service site's antenna picks up uplink transmissions from cell phones or similar devices. These uplink frequencies are separated and filtered, amplified to boost the signal to an acceptable level, then combined and converted into a modulated light signal via an RFOG transmitter. These light signals from multiple service sites are combined using PLC splitters or similar technology, then demodulated at the donor site, amplified, and transmitted via the donor site's antenna to the appropriate cellular tower.

When it comes to TDD (Time Division Duplexing) service on mm Wave frequencies, the system has a unique way of separating uplink and downlink activities based on the uplink activity of the connected device. A single-pole double-throw (SPDT) switch in the system is normally closed on the downlink connection, meaning the system defaults to processing downlink signals. However, if uplink activity exceeds a certain threshold, the switch toggles to close on the uplink side, enabling the system to process uplink signals instead. A similar process of signal amplification, conversion, splitting, and transmission/reception is followed as detailed earlier.

Alternatively, if an eNodeB Base Transceiver Station (BTS) is connected instead of an antenna, the downlink pathway will be primarily used for signaling since it will only "hear" the connected BTS, indicating that the BTS is transmitting signals to the mobile devices. This configuration allows the system to support network-controlled signaling and communication. This holistic system architecture is not only flexible in supporting both FDD and TDD, but it also allows the transport of various radio services over large distances, enhancing connectivity in areas that might otherwise be challenging to cover.

The disclosed invention presents several key advantages. By strategically placing the donor site at a high elevation, it ensures optimal reception of various radio services, which can range from cellular phone service to FM radio. The use of a variety of filters allows the system to isolate specific frequency bands, and the subsequent amplification and conversion processes improve the strength and reach of these signals. The Planar Lightwave Circuit (PLC) splitter enables delivery to multiple service sites, extending coverage to areas that may otherwise be challenging to connect, and providing services over distances that can range from a few hundred feet to hundreds of miles. Furthermore, the design supports both Frequency Division Duplexing (FDD) and Time Division Duplexing (TDD), making it flexible for various use-cases. The integration of a single-pole double-throw (SPDT) switch for TDD service on mmWave frequencies, enables a smart toggling between uplink and downlink signals, optimizing the communication flow. Lastly, the system's architecture allows the integration of future technologies, making it a robust, flexible, and future-ready solution for the delivery of radio spectrum services.

Although the present invention has been described with respect to various schematic representations (FIGS. 1-4), it should be understood that the proposed system and method can be realized and implemented with varying shapes and sizes, and thus the present invention here should not be considered limited to the exemplary embodiments and processes described herein. The various dimensions may be modified to fit in specific application areas. Although particular embodiments of the invention have been described in detail for purposes of illustration, various modifications and enhancements may be made without departing from the spirit and scope of the invention.

What is claimed is:

1. A system for capturing, amplifying, and redistributing radio spectrum services, comprising:
    a donor site equipped with an antenna for receiving signals;
    a filter for separating received signals into multiple frequency bands;
    an amplifier for enhancing separated signals;
    a Hybrid Fiber Coax RF over Glass (RFOG) headend transmitter for converting amplified signals into modulated light;
    a fiber-optic cable for carrying modulated light;
    a Planar Lightwave Circuit (PLC) splitter for dividing the modulated light beam;
    one or more service sites equipped with an RFOG HFC node receiver for reconverting modulated light into radio signals; and
    a transmission amplifier for boosting the reconverted radio signals for wider coverage.

2. The system of claim 1, wherein the donor site is located at a high elevation point to ensure optimal signal reception.

3. The system of claim 1, wherein the radio spectrum services include cellular phone service, public safety radio, UHF/VHF radio repeaters, or FM radio.

4. The system of claim 1, wherein the filters are selected from the group consisting of duplex filters, simplex filters, cavity filters, strip filters, passive filters, and software filters implemented in FPGAs.

5. The system of claim 1, wherein the RFOG headend transmitter and the RFOG HFC node receiver enable the conversion and reconversion between radio signals and modulated laser signals.

6. The system of claim 1, wherein the PLC splitter can split the modulated laser beam to deliver to multiple service sites.

7. The system of claim 1, wherein the service sites amplify and transmit the reconverted radio signals to blanket the service areas with the desired signals.

8. The system of claim 1, further comprising an uplink pathway for receiving, filtering, and amplifying uplink transmissions from cellular devices or similar devices at the service sites.

9. The system of claim 8, wherein the uplink pathway combines amplified signals, converts them into a modulated light signal, combines the light signals from multiple service sites, and transmits the combined light signal to the appropriate cellular tower via the donor site.

10. The system of claim 1, wherein the system separates uplink and downlink activities for TDD cell phone service on mmWave frequencies using a single-pole double-throw (SPDT) switch based on the uplink activity of the connected device.

11. The system of claim 10, wherein the SPDT switch is normally closed on the downlink connection, enabling the system to default to processing downlink signals.

12. The system of claim 10, wherein the SPDT switch toggles to close on the uplink side when uplink activity exceeds a certain threshold, enabling the system to process uplink signals.

13. The system of claim 1, further comprising an eNodeB Base Transceiver Station (BTS) connected instead of an antenna.

14. The system of claim 13, wherein the downlink pathway is primarily used for signaling since it only hears the connected BTS.

15. The system of claim 1, wherein the system is capable of supporting both FDD and TDD.

16. The system of claim 1, wherein the system allows the transport of various radio services over large distances.

17. The system of claim 1, wherein the system enhances connectivity in areas that might otherwise be challenging to cover.

18. The system of claim 1, wherein the service sites are located hundreds of feet to hundreds of miles away from the donor site.

19. The system of claim 1, wherein the donor site, filters, amplifier, RFOG headend transmitter, fiber-optic cable, PLC splitter, service sites, and transmission amplifier function in a coordinated manner to capture, amplify, and redistribute radio spectrum services.

20. The system of claim 1, wherein the system includes other future technologies for signal filtering, amplification, conversion, transmission, and reception to improve the performance and coverage of the radio spectrum services.

* * * * *